(12) United States Patent
Kawabata et al.

(10) Patent No.: US 12,354,862 B2
(45) Date of Patent: Jul. 8, 2025

(54) METHOD FOR ANALYZING METAL MICROPARTICLES, AND INDUCTIVELY COUPLED PLASMA MASS SPECTROMETRY METHOD

(71) Applicant: IAS Inc., Tokyo (JP)

(72) Inventors: Katsuhiko Kawabata, Tokyo (JP); Tatsuya Ichinose, Tokyo (JP); Kohei Nishiguchi, Tokyo (JP)

(73) Assignee: IAS, INC, Tokyo (JP)

( * ) Notice: Subject to any disclaimer, the term of this patent is extended or adjusted under 35 U.S.C. 154(b) by 26 days.

(21) Appl. No.: 18/084,978

(22) Filed: Dec. 20, 2022

(65) Prior Publication Data

US 2023/0335387 A1   Oct. 19, 2023

Related U.S. Application Data

(62) Division of application No. 17/043,406, filed as application No. PCT/JP2019/033880 on Aug. 29, 2019, now Pat. No. 11,569,081.

(51) Int. Cl.
*H01J 49/10* (2006.01)
*G01N 27/623* (2021.01)
(Continued)

(52) U.S. Cl.
CPC .......... *H01J 49/105* (2013.01); *G01N 27/623* (2021.01); *H01J 49/0009* (2013.01); *H01J 49/04* (2013.01)

(58) Field of Classification Search
CPC .................................................. H01J 49/105
See application file for complete search history.

(56) References Cited

U.S. PATENT DOCUMENTS 9,406,490 B1    8/2016 Saetveit et al.
10,170,291 B1 *  1/2019 Hsu ..................... H01J 49/0422
(Continued)

FOREIGN PATENT DOCUMENTS

JP    H03-108246 A    5/1991
JP    2007-57420 A1   3/2007
(Continued)

OTHER PUBLICATIONS

Extended European Seach Report for Application No. 19845065.2 Mar. 3, 2021.
(Continued)

*Primary Examiner* — Michael J Logie
(74) *Attorney, Agent, or Firm* — Roberts & Roberts, LLP

(57) ABSTRACT

A method for analyzing a sample containing metal fine particles with an inductively coupled plasma mass spectrometer. The method enables analysis of the sample without the need of standard metal fine particles. Specifically, the present invention relates to a method for analyzing metal fine particles in liquid by use of an inductively coupled plasma mass spectrometer. In the method, the analysis apparatus is provided with a standard solution introduction apparatus including a standard solution storage unit for storing a standard solution containing a specific element in a known concentration, a syringe pump for suctioning and discharging the standard solution, and a solution introduction unit having a standard solution nebulizer and a standard solution spray chamber that are supplied with the standard solution, the standard solution is directly supplied to the standard solution nebulizer at a flow rate of 3 μL/min or less.

2 Claims, 5 Drawing Sheets

(51) Int. Cl.
*H01J 49/00* (2006.01)
*H01J 49/04* (2006.01)

(56) References Cited

U.S. PATENT DOCUMENTS

| | | | |
|---|---|---|---|
| 2009/0014640 A1* | 1/2009 | Schaumloffel | B05B 7/066 239/338 |
| 2010/0276019 A1* | 11/2010 | Kawabata | G01N 1/38 137/565.26 |
| 2016/0056028 A1 | 2/2016 | Wiederin et al. | |
| 2017/0276296 A1 | 9/2017 | Wiederin et al. | |
| 2018/0024068 A1 | 1/2018 | Kawabata | |
| 2020/0103077 A1 | 4/2020 | Wiederin | |
| 2020/0135443 A1* | 4/2020 | Itagaki | H01J 49/105 |
| 2021/0148858 A1* | 5/2021 | Kkawabata | H01J 49/04 |

FOREIGN PATENT DOCUMENTS

| | | |
|---|---|---|
| JP | 2009-210435 A | 9/2009 |
| JP | 2016-40537 A | 3/2016 |
| JP | 2017-511882 A | 4/2017 |
| JP | 2017-528707 A | 9/2017 |
| JP | 2018-136190 A | 8/2018 |
| WO | 2015122920 A1 | 8/2015 |
| WO | 2016028868 A1 | 2/2016 |
| WO | 2017/033796 A1 | 3/2017 |

OTHER PUBLICATIONS

Pace, Heather e., et al; "Determining Transport Efficiency for the Purpose of Counting and Sizing Nanoparticles via Single Particle Inductively Coupled Plasma Mass Spectrometry"; Analytical Chemistry; 2011, vol. 83, No. 24; pp. 9361-9369; Nov. 11, 2011; XPO55144591.

Dressler, Valderi, L., et al. "Biomonitoring of essential and toxic metals in single hair using on-line solution-based calibration in laser ablation inductively coupled plasma mass spectrometry"; Talanta, Elsevier, Amsterdam, NL; vol. 82, No. 5, pp. 1770-1777; Oct. 5, 2010; XPO27338837.

* cited by examiner

METHOD FOR ANALYZING METAL MICROPARTICLES, AND INDUCTIVELY COUPLED PLASMA MASS SPECTROMETRY METHOD

CROSS REFERENCE TO RELATED APPLICATIONS

The present application is a divisional of and claims the benefit of co-pending U.S. application Ser. No. 17/043,406 filed on Sep. 29, 2020 as a U.S. national phase entry of International Appln. No. PCT/JP2019/033880 filed on Aug. 29, 2019, all of which are incorporated herein by reference.

TECHNICAL FIELD

The present invention relates to a method for analyzing metal fine particles contained in liquid or gas, and an inductively coupled plasma mass spectrometry technique using the analysis method.

BACKGROUND ART

In recent years, it has been known that an inductively coupled plasma mass spectrometer (hereinafter, sometimes abbreviated as ICP-MS) is used for analysis of metallic impurities in chemical solution or gas used in a semiconductor industry. The metal to be analyzed is sometimes present as metal fine particles in liquid or gas, and the metal fine particles are known to be analyzed with ICP-MS.

As shown in FIG. 1, an apparatus configured to analyze a solution system in the ICP-MS includes a sample storage section 101 for storing a sample solution to be measured; a sample introduction section having a sample nebulizer 102 and a sample spray chamber 103; a torch section 104 for ionizing a sample by forming a plasma; an interface section 105 for taking ions from the plasma; a mass analysis section 106 for separating ions; and a detection section 107 for detecting the separated ions. In the ICP-MS, atoms of a metal element contained in the sample solution are ionized, and some of the ionized atoms reach a detector by passing through the mass analysis section and are detected as pulse counts. In general, at the time when $10^4$ to $10^6$ atoms are introduced into a plasma, and ionized, one ion reaches a detector, and is detected as a signal intensity of 1 count.

When a concentration of metal dissolved in a sample solution is analyzed in the ICP-MS, a calibration curve (concentration vs signal intensity) obtained by analyzing a standard solution containing the metal is used (for example, Patent Document 1). A calibration curve of signal intensity against metal concentration of a standard solution is prepared beforehand, and a metal concentration in a sample solution is measured from the signal intensity in the sample solution.

On the other hand, when a sample solution with metal mixed in a solution as metal fine particles is analyzed, a standard solution containing a predetermined amount of metal fine particles having a known particle diameter is analyzed beforehand to measure the number of metal fine particles obtained from a detector and a signal intensity per metal fine particle. In the detector, when one metal fine particle is detected, a signal intensity corresponding to an ion of a metal element forming the metal fine particle appears as a peak, and therefore the number of the peaks is measured as the number of the metal fine particles reaching the detector. In addition, the signal intensity correlates with a particle diameter of the metal fine particle.

Specifically, an example will be described in which metal (tentatively called metal A) fine particles having a particle diameter of 50 nm are used as a standard. Hereinafter, an imaginary metal element (A) is used for the sake of convenience of explanation. When a standard solution is used in which metal (A) fine particles having a particle diameter of 50 nm and serving as a standard are present at a concentration of $10^6$ particles per mL, the standard solution is suctioned into a nebulizer at a rate of 1 μL/sec, and analyzed. If detector detects 100 metal (A) fine particles per second, a ratio of metal (A) fine particles passing through a spray chamber is 10% because 100 particles are actually detected among 1,000 particles introduced into the nebulizer per second. In addition, when the signal intensity from one metal (A) fine particle is 50 counts, a weight of metal (A) fine particles having a 50 nm particle diameter (654 ag), which is obtained from a volume of metal (A) fine particles having a particle diameter of 50 nm ($6.54 \times 10^{-17}$ cm$^3$) and a density of metal (A) fine particles having a particle diameter of 50 nm (tentatively set to 10 g/cm$^3$), is divided by the signal intensity (50 counts) to obtain a weight sensitivity value (654/50=13.08 ag/count) per count. The weight sensitivity value per count from metal (A) fine particles shows a signal intensity detected with respect to an absolute amount of metal (A) fine particles introduced into a torch section, and when the sample solution to be measured contains metal (A) fine particles, a particle diameter of metal (A) fine particles in the sample solution can be calculated from a signal intensity value from one metal (A) fine particle which is obtained as a result of detecting the signal intensity.

In addition, for analyzing the concentration of metal (A) fine particles in the sample solution, transmission efficiency of a sample spray chamber in a sample introduction section is required to be measured beforehand. In this spray chamber, only fine aerosols, among aerosols formed by the nebulizer with the aid of argon gas, are selected, and introduced to the torch section. A ratio of an amount of liquid, which is fed to the torch section from the spray chamber, to an amount of liquid suctioned into the nebulizer is called transmission efficiency of the spray chamber. The transmission efficiency can be calculated from the number of particles, which is determined with the metal (A) fine particles as a standard, but it is very difficult to determine the accurate number of particles in the standard solution. Thus, a method is used in which transmission efficiency of the spray chamber is determined from a ratio of a sensitivity over a range from the nebulizer to the detector to a sensitivity over a range from the plasma in the torch section to the detector. That is, the transmission efficiency is determined by comparing a weight sensitivity value per count over a range from the nebulizer to the detector, which is obtained by analyzing a metal (A) standard solution having a known concentration by ICP-MS, with a weight sensitivity value per count over a range from the plasma in the torch section to the detector, which is obtained with a standard solution containing metal (A) fine particles having a known particle diameter.

Specifically, a standard solution having a metal (A) concentration of 1 ppb (1 pg/μL) is suctioned into the nebulizer at a rate of 1 μL/sec to perform analysis. When the detector detects 10,000 counts per second, a weight sensitivity value per count over a range from the nebulizer to the detector ($10^6/10^4$=100 ag/count) is obtained from an introduction rate into the nebulizer (1 pg/sec=$10^6$ ag/sec). The weight sensitivity value per count in introduction into the nebulizer represents a signal intensity detected with respect to the weight (absolute amount) of metal (A) introduced into the nebulizer. Thus, the weight sensitivity value of the metal (A) fine particles per count over a range from the plasma in the torch section to the detector is divided by the weight sensitivity value per count in introduction into the nebulizer (13.08/100=0.13) to determine transmission efficiency (13%) through the spray chamber used. That is, it is shown that 13% of the amount of liquid suctioned into the nebulizer is equal to the amount of liquid fed to the torch section from the spray chamber used. When the transmission efficiency of the spray chamber is known, the introduction rate into the torch section is known, and therefore the introduction rates of elements other than the element of metal (A) fine particles having a known particle diameter into the torch section is determined, so that concentrations of metal fine particles of those elements in the sample solution can be calculated.

When a sample solution present in liquid in a state of metal fine particles is analyzed by ICP-MS, it is necessary to prepare a standard solution containing metal fine particles having a known particle diameter. For elements such as Au, metal fine particles having a known particle diameter are commercially available, but for many metal elements that can be analyzed by ICP-MS, it is extremely difficult to prepare metal fine particles having a known particle diameter. In addition, when a standard solution is prepared with metal fine particles of Au having a known particle diameter, accurate control of a particle diameter and the number of particles involves very difficult operation due to aggregation, dissolution and the like of the fine particles, and the analysis cannot be quickly performed.

In addition, in inductively coupled plasma mass spectrometry, analysis of a sample gas with a gas containing metal fine particles; and analysis called laser ablation ICP-MS in which a solid sample is irradiated with laser light to evaporate and atomize the sample, and the atomized sample is directly analyzed (for example, Patent Document 2). In analysis of metal fine particles in a gas phase as described above, it is difficult to prepare metal fine particles having a known particle diameter for many metal elements that can be analyzed by ICP-MS, and therefore the metal fine particles in the gas phase cannot be efficiently analyzed.

RELATED ART DOCUMENT

Patent Documents

Patent Document 1: JP H3-108246 A
Patent Document 2: JP 2018-136190 A

SUMMARY OF THE INVENTION

Problems to be Solved by the Invention

Against the background of the above circumstances, an object of the present invention is to provide a method for analyzing metal fine particles, in which a sample containing metal fine particles to be measured is analyzed with an inductively coupled plasma mass spectrometer, the method enabling a particle diameter of specific element metal fine particles to be obtained by using a standard solution containing a specific element without the need of standard metal fine particles. Another object of the present invention is to provide an inductively coupled plasma mass spectrometry method for measuring the number and the concentration of the metal fine particles contained in the sample by using the method for analyzing metal fine particles.

Means for Solving the Problems

The present inventors have found that when a standard solution having a specific element in a known concentration is directly supplied to a nebulizer at an extremely low flow rate, substantially 100% (total amount) of the standard solution introduced from a spray chamber to a torch section can be introduced into a plasma. Thus, the present inventors have arrived at the present invention.

The present invention provides a method for analyzing metal fine particles in liquid by use of an inductively coupled plasma mass spectrometer including: a sample storage section for storing a sample solution to be measured; a sample introduction section having a sample nebulizer and a sample spray chamber; a torch section for ionizing the sample by forming a plasma; an interface section for taking ions from the plasma; a mass analysis section for separating ions; and a detection section for detecting the separated ions, in which the inductively coupled plasma mass spectrometer is provided with a standard solution introduction apparatus including a standard solution storage unit for storing a standard solution containing a specific element in a known concentration, a syringe pump for suctioning and discharging the standard solution, and a solution introduction unit having a standard solution nebulizer and a standard solution spray chamber that are supplied with the standard solution, a standard solution introduction passage for introducing the standard solution flowing out from the standard solution spray chamber is connected to a flow passage connecting the sample introduction section to the torch section, the standard solution is directly supplied to the standard solution nebulizer at a flow rate of 3 μL/min or less to introduce the standard solution into the torch section from the solution introduction unit, and a standard solution sensitivity value that is a specific element weight per count is determined based on a standard solution signal intensity obtained from a detector and a physical amount of the introduced specific element, and a particle diameter value of metal fine particles of the specific element is calculated from a sample solution signal count number of one metal fine particle of the specific element, which is obtained from the detector by introduction of the sample solution, and the standard solution sensitivity value.

The present invention relates to an inductively coupled plasma mass spectrometry method for analyzing a metal fine particle number and a metal fine particle concentration by use of the standard solution sensitivity value in the method for analyzing metal fine particles in liquid, in which a sample standard solution containing a specific element in a known concentration is introduced into the torch section from the sample introduction section, and a sample introduction section sensitivity value that is a specific element weight per sample standard solution signal intensity count is calculated from a sample standard solution signal intensity obtained from the detector, transmission efficiency of the sample spray chamber is calculated from the standard solution sensitivity value and the sample introduction section sensitivity value, the number of specific element metal fine particles contained in the sample solution is calculated from the number of specific element metal fine particles obtained from the detector by introducing a sample solution to be measured into the torch section from the sample introduction section for a certain period of time, and the transmission efficiency of the sample spray chamber, and a total weight of specific element metal fine particles contained in the sample solution is calculated from a total integrated value of specific element metal fine particle signal intensities obtained from the detector by introduction of the sample solution, the standard solution sensitivity value and the transmission efficiency of the spray chamber, and a metal fine particle concentration of the sample solution is calculated from a sample solution introduction rate obtained from a flow rate detection unit provided between the sample storage section and the sample introduction section, and the calculated total weight of specific element metal fine particles.

The present invention also provides a method for analyzing metal fine particles in gas by use of an inductively coupled plasma mass spectrometer including: a gasified sample introduction section for introducing a sample gas generated by a laser ablation device for evaporating and atomizing a sample by irradiating a solid sample to be measured with laser light, or a gas exchange device for replacing by argon gas with a gas component of a sample gas containing an object to be measured; a torch section for ionizing the sample by forming a plasma; an interface section for taking ions from the plasma; a mass analysis section for separating ions; and a detection section for detecting the separated ions, in which the inductively coupled plasma mass spectrometer is provided with a standard solution introduction apparatus including a storage unit for storing a standard solution containing a specific element in a known concentration, a syringe pump for suctioning and discharging the standard solution, and a solution introduction unit having a standard solution nebulizer and a standard solution spray chamber that are supplied with the standard solution, a standard solution introduction passage for introducing the standard solution flowing out from the standard solution spray chamber is connected to a flow passage connecting the gasified sample introduction section to the torch section, the standard solution is directly supplied to the standard solution nebulizer at a flow rate of 3 µL/min or less to introduce the standard solution into the torch section from the solution introduction unit, and a standard solution sensitivity value that is a specific element weight per standard solution signal intensity count is determined based on a standard solution signal intensity obtained from a detector and a physical amount of the introduced specific element, and a particle diameter value of metal fine particles of the specific element is calculated from a signal intensity count number of one metal fine particle of the specific element, which is obtained from the detector by introduction of the sample gas, and the standard solution sensitivity value.

Further, the present invention relates to an inductively coupled plasma mass spectrometry method for analyzing a metal fine particle number and a metal fine particle concentration by use of the standard solution sensitivity value in the method for analyzing metal fine particles in gas, in which analysis is the number of specific element metal fine particles obtained from the detector by introducing a sample gas to be measured into the torch section from the sample introduction section for a certain period of time, and a metal fine particle concentration of the sample gas is calculated from a total integrated value of specific element metal fine particle signal intensities obtained from the detector by introduction of the sample gas, the standard solution sensitivity value obtained by the method of standard addition and the introduction rate of the sample gas.

In the method for analyzing metal fine particles in the present invention, it is important that the standard solution stably supplied directly to the standard solution nebulizer at a flow rate of 3 µL/min or less. Thus, as the syringe pump for suctioning and discharging the standard solution, a syringe pump having high performance is used. Specifically, it is preferable to use a high performance syringe pump capable of stably discharging the solution at a flow rate of 0.1 µL/min.

In the present invention, the standard solution is directly supplied to the standard solution nebulizer at a flow rate of 3 µL/min or less, and substantially 100% (total amount) of the supplied standard solution can be introduced into a plasma. This was confirmed through the following verifications. Verification 1: the standard solution sensitivity value that is a specific element weight per standard solution signal intensity count did not change even when the standard solution spray chamber was heated to change the temperature. Verification 2: the sensitivity value obtained with Au metal fine particles having a known particle diameter was substantially equal to the standard solution sensitivity value. Verification 3: the introduction rate of the standard solution was changed, and as a result the signal intensity changed in linear manner when the flow rate was not more than 3 µL/min. When the flow rate was more than 3 µL/min, the signal intensity tended to decrease, and a phenomenon was observed in which the standard solution started to be trapped in the standard solution spray chamber. Verification 4: standard solution sensitivity values obtained by using three nebulizers of the same type as standard solution nebulizers were compared, and the result showed that the relative standard deviation was 1% or less.

Advantageous Effects of the Invention

The present invention enables the particle diameter of metal fine particles contained in a sample to be measured and the number of metal fine particles and the concentration of metal fine particles contained in the sample to be analyzed without the need of standard metal fine particles.

DESCRIPTION OF EMBODIMENTS

Figure 1:
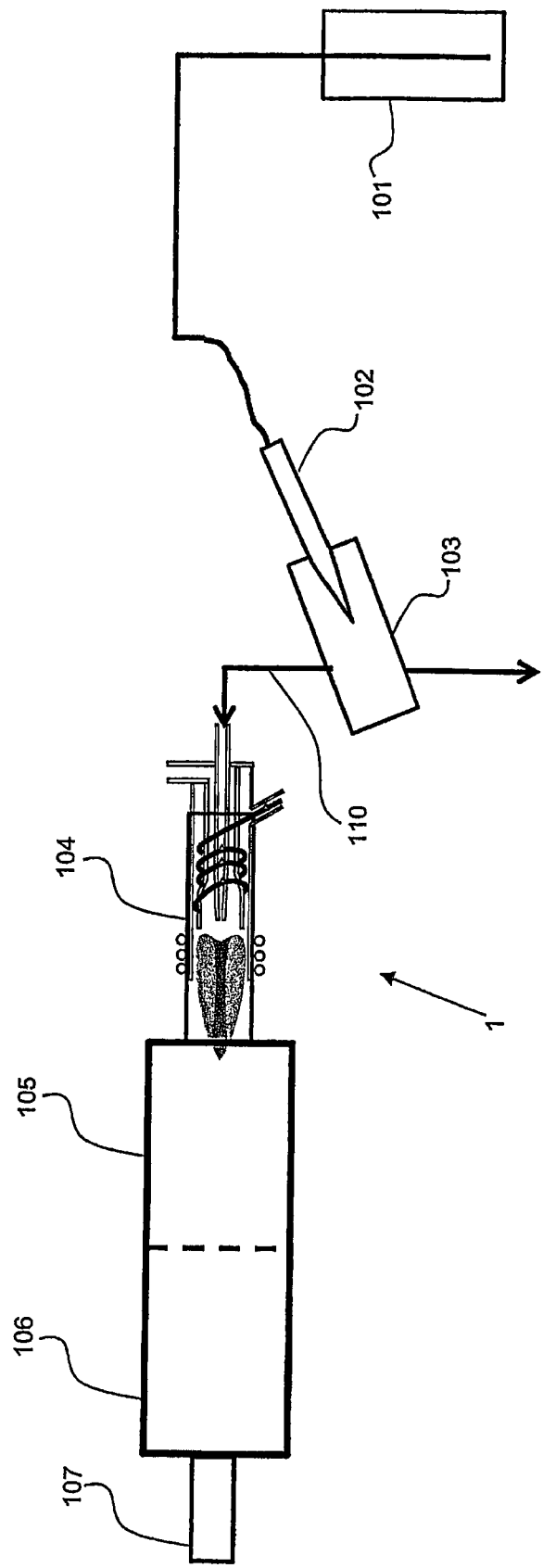
FIG. 1 is a schematic diagram of a conventional inductively coupled plasma mass spectrometer.
Figure 2:
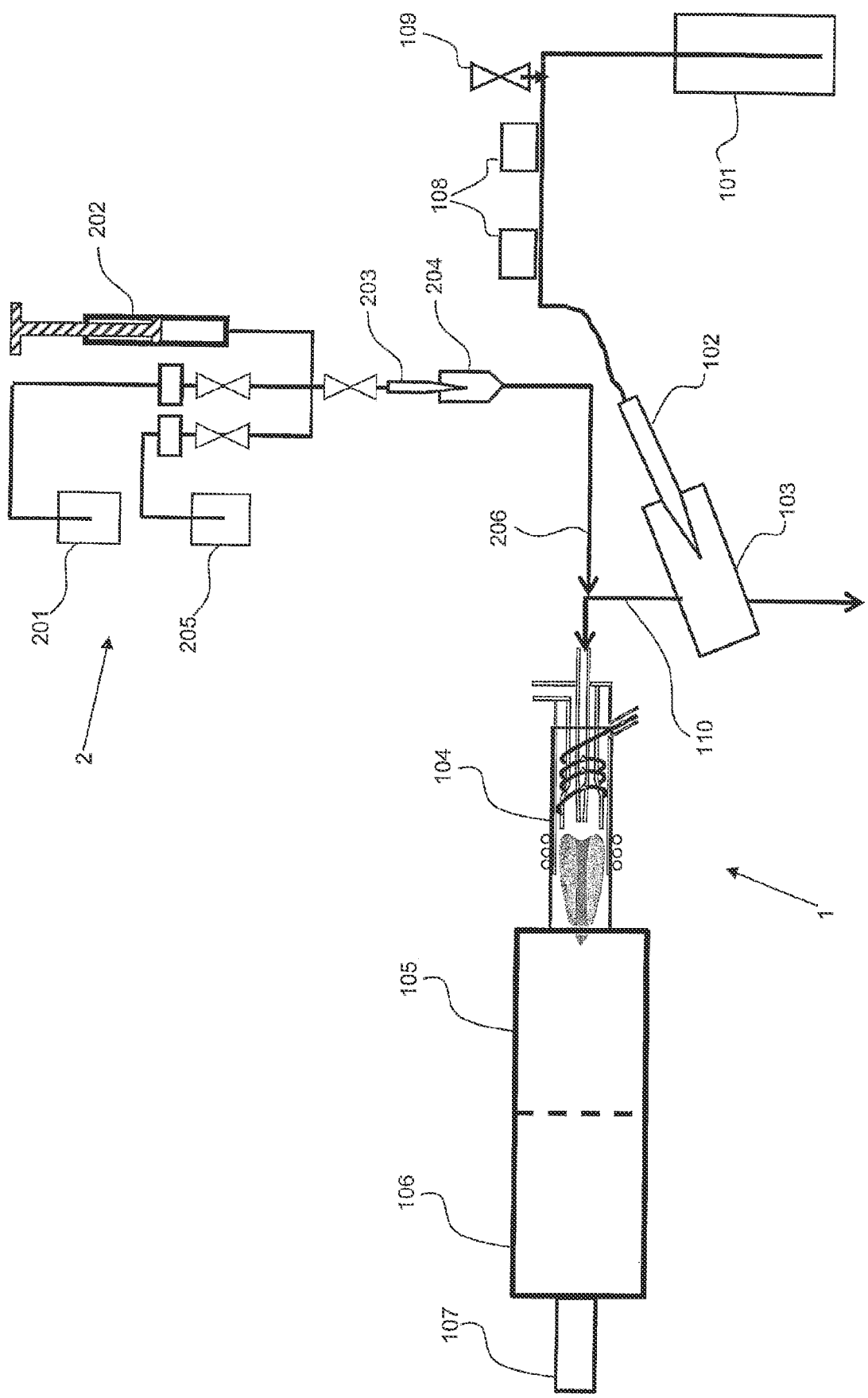
FIG. 2 is a schematic diagram of an inductively coupled plasma mass spectrometer of the present embodiment.

In this embodiment, an example will be described in which a solution-based sample is analyzed. FIG. 2 shows a schematic diagram of a conventional inductively coupled plasma mass spectrometer of the present embodiment. A standard solution introduction apparatus 2 is connected to the ICP-MS shown in FIG. 2. In the standard solution introduction apparatus 2 includes a standard solution storage container 201 for storing a standard solution, a syringe pump 202 for suctioning and discharging the standard solution, and a standard solution nebulizer 203 and a standard solution spray chamber 204 which are supplied with the standard solution. The standard solution introduction apparatus 2 also includes a waste container 205 for disposal. As the syringe pump 202, a syringe pump capable of controlling a flow rate of 0.1 to 99.0 µL/min. The control flow rate in this syringe pump is determined by performing calculation from the physical operation amount of a ball screw used in a syringe forming the syringe pump. The apparatus configuration of the main body of ICP-MS (Model 8800 manufactured by Agilent Technologies) other than the standard solution introduction apparatus 2 is basically the same as that shown in FIG. 1, and a flow passage connecting a sample storage section 101 to a sample solution nebulizer 102 is provided with an optical sensor 108 for measuring the introduction rate of a sample solution introduced into the nebulizer, and an air injection valve 109.

A standard solution introduction passage 206 for introducing the standard solution which flows out from the standard solution spray chamber 204 of the standard solution introduction apparatus 2 is connected to a flow passage 110 connecting a sample solution spray chamber 103 of a sample introduction section to a torch section 104.

In the present invention, as shown in FIG. 2, a standard solution introduction apparatus is separately installed in the ICP-MS main body, and an introduction flow passage for analysis of a sample solution is kept on the ICP-MS main body side. The reason for this is that operations such as change of the sample solution during analysis can be quickly performed, and that when a sample solution containing metal fine particles to be measured is analyzed, it is necessary to introduce the sample solution into the torch section at a certain degree of introduction rate.

When the standard solution is directly supplied to the standard solution nebulizer 203 at a flow rate of 3 µL/min or less with Ar nebulizer gas flow supplied to the nebulizer 203 is at 0.3 L/min, substantially 100% (total amount) of the supplied standard solution can be introduced into a plasma. The Ar nebulizer gas flow should be as small as possible because the total Ar gas flow to the plasma of ICP-MS is around 1 L/min and another Ar nebulizer gas flow that is supplied to the nebulizer 102 needs at least 0.7 L/min to generate fine aerosol of sample solution. When the maximum Ar gas flow supplied to the nebulizer 203 is at 0.3 L/min, the maximum standard solution is 3 uL/min in order to have the 100% introduction. This was confirmed through four verifications, which will be described below.

<Verification 1> The standard solution sensitivity value that is a specific element weight per standard solution signal intensity count was examined while the standard solution spray chamber was heated to change the temperature. The standard solution sensitivity value that is a specific element weight per standard solution signal intensity count was obtained in the following manner.

As the standard solution, a standard solution containing Au in an amount of 10 ppb {(ng/mL) or (pg/µL) as an alternative unit} was used. The standard solution was directly introduced into the standard solution nebulizer at a flow rate of 1 µL/min, and a signal intensity detected was examined. In analysis of the standard solution, pure water was supplied to the sample solution nebulizer at a flow rate of 0.3 mL/min on the ICP-MS main body side. In addition, argon gas (Ar) was supplied to the standard solution nebulizer and the sample solution nebulizer.

The signal intensity obtained from the detector was 29,159 counts per second (29,159 counts/sec). In addition, the absolute amount of introduction per second of Au suctioned into the standard solution nebulizer is 10 pg/min=0.167 pg/sec=167,000 ag/sec. Accordingly, a standard solution sensitive value that is a specific element weight per standard solution signal intensity count was 167,000/29,159=5.72 ag/counts. The temperature of the standard solution spray chamber at this time was 23° C.

With the base temperature of the standard solution spray chamber set to 23° C., the standard solution spray chamber was heated to 120° C., and a standard solution sensitivity value that is a specific element weight per standard solution signal intensity count was determined under a similar condition. The result showed that the standard solution sensitivity value was 5.71 ag/counts. From this result, substantially 100% (total amount) of the standard solution directly supplied to the standard solution nebulizer was considered as having been introduced into the plasma because even when the temperature of the standard solution spray chamber was changed, the standard solution sensitivity value did not change when the standard solution was directly supplied to the standard solution nebulizer at a flow rate of 1 µL/min.

<Verification 2> Au metal fine particles having a particle diameter of 60 nm were used to perform analysis. The signal intensity of one of the Au metal fine particles having a particle diameter of 60 nm was 385 counts. Since the volume of one of the Au metal fine particles having a particle diameter of 60 nm is $1.13E-16$ cm$^3$, and the density of Au is 19.32 g/cm$^3$, the weight of one Au metal fine particle is 2,183.16 ag. This weight is divided by 385 counts to get 5.67 ag/count. That is, the sensitivity value determined from the signal intensity of one of the Au metal fine particles having a particle diameter of 60 nm is equivalent to 5.67 ag/count.

Under the same conditions as in verification 1, a standard solution containing Au in an amount of 10 ppb was provided, the standard solution was directly suctioned into the standard solution nebulizer at a flow rate of 1 µL/min, and a signal intensity detected was examined. As a result, the signal intensity obtained from the detector was 29,159 counts per second (29,159 counts/sec). This result showed that the standard solution sensitivity value of the standard solution containing Au was 5.72 ag/counts. The sensitivity value obtained from the Au metal fine particles was compared to the standard solution sensitivity value (5.67/5.72=0.992 (99.2%)), and as a result, substantially 100% (total amount) of the standard solution directly supplied to the standard solution nebulizer was considered as having been introduced into the plasma.

Figure 3:
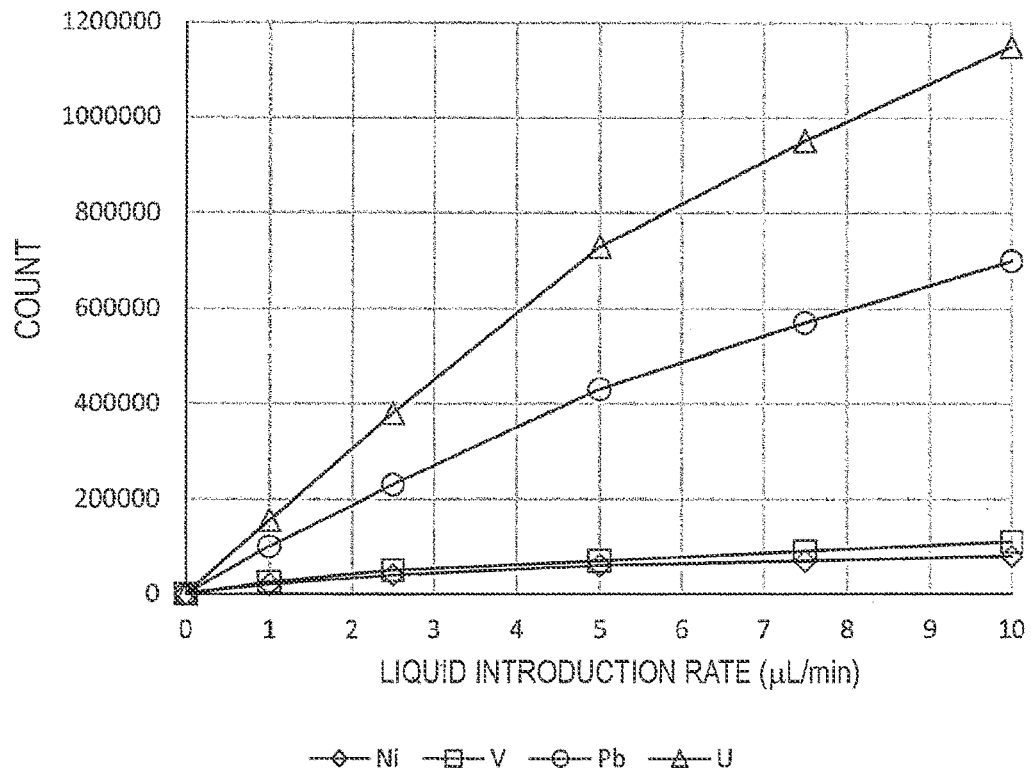
FIG. 3 is a graph showing a relationship between a standard solution introduction rate and a signal intensity.

<Verification 3> The introduction rate of the standard solution was changed, and a change in signal intensity of the standard solution was examined. A standard solution containing a mixture of four metals of vanadium (V), nickel (Ni), lead (pb) and uranium (U) was introduced into the standard solution nebulizer at introduction rates of 0, 1, 2.5, 5.0, 7.5 and 10 µL/min, and the signal intensity at each of the introduction rates was examined. The results are shown in FIG. 3. It was found that as shown in FIG. 3, the signal intensity increased in a linear manner when the flow rate was 1 to 5 µL/min.

Figure 4:
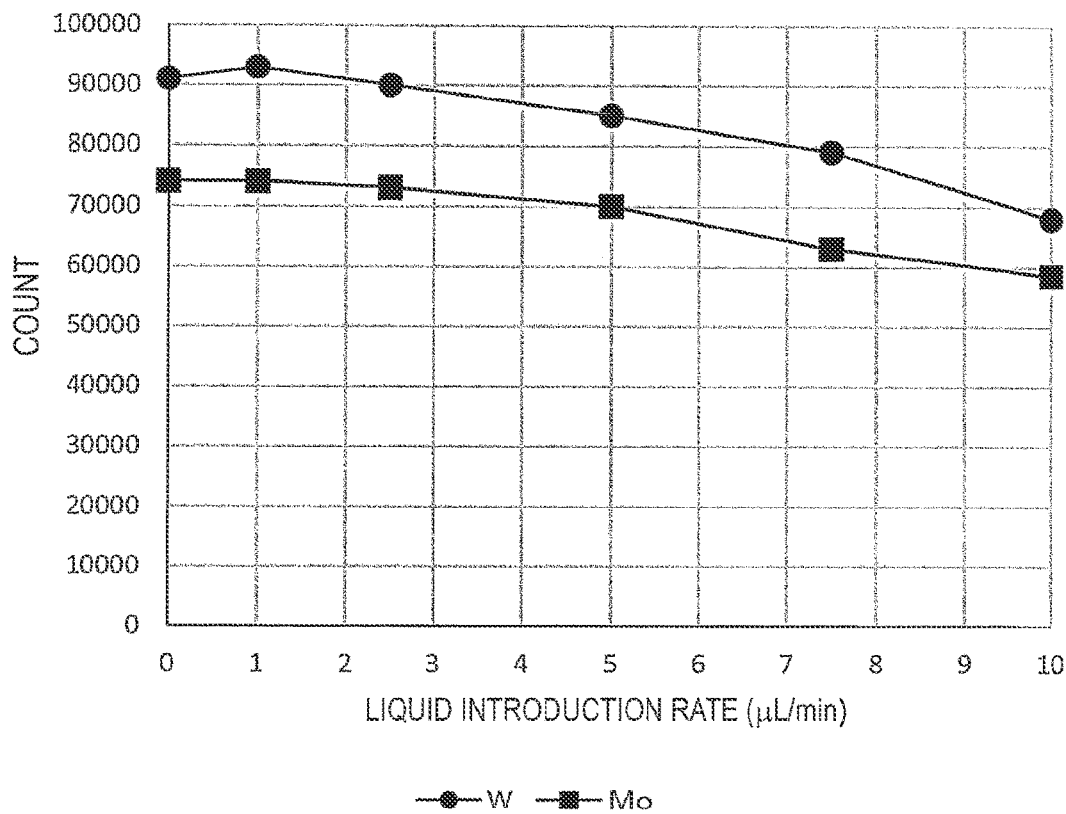
FIG. 4 is a graph showing a relationship between a standard solution introduction rate and a signal intensity of an internal standard.
Figure 5:
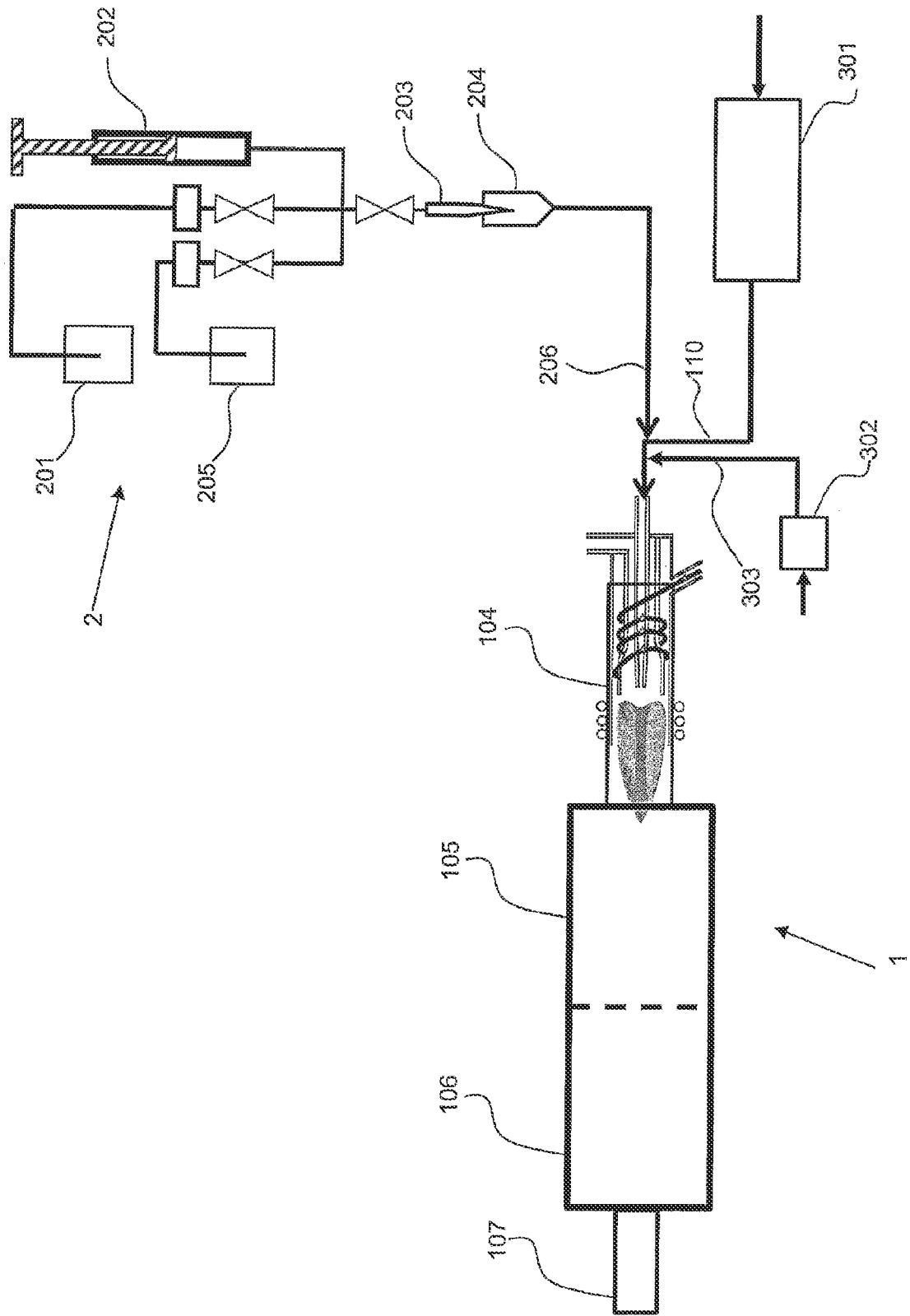
FIG. 5 is a schematic diagram of an inductively coupled plasma mass spectrometer for analysis of sample gas in the embodiment.

FIG. 4 shows the result of examination of the signal intensity when metal elements Mo and W are used as an internal standard, and the introduction rate of the standard solution is changed. These metal elements were derived from carbonyl compounds of Mo(CO)$_6$ and W(CO)$_6$. These compounds sublimate at normal temperature to generate a certain gas vapor. FIG. 5 shows a schematic diagram of an inductively coupled plasma mass spectrometer in analysis of Mo and W as an internal standard. The inductively coupled plasma mass spectrometer is the same as in FIG. 2 for the range from torch section 104 to the detection section 107 in the ICP-MS main body 1, and the standard solution introduction apparatus 2. The inductively coupled plasma mass spectrometer is different from that in FIG. 2 in that a gas exchange device 301 is provided at the sample solution spray chamber. The gas exchange device 301 replaces by argon gas with a gas component of a sample gas containing an object to be measured. In addition, a metal standard gas generator 302 and a metal standard gas introduction passage 303 are connected to the flow passage 110 connecting the gas exchange device 301 (the arrow directed to the gas exchange device 301 indicates introduction of sample gas) to the torch section 104. The argon gas is introduced into the metal standard gas generator 302 (the arrow directed to the metal standard gas generator 302 indicates introduction of argon gas), and the carbonyl compounds of $Mo(CO)_6$ and $W(CO)_6$ are put in the metal standard gas generator 302.

Mo and W sublimated with the argon gas at a constant flow rate of 0.2 L/min were introduced into the torch section 104 through the metal standard gas introduction passage 303 while the standard solution was introduced with the apparatus shown in FIG. 5. The introduction rates of the standard solution were 0, 1, 2.5, 5.0, 7.5 and 10 µL/min, and the signal intensity of Mo and W at each of the introduction rates was examined. At this time, the argon gas flew out from the gas exchange device 301 (flow rate: 0.8 mL/min).

It was confirmed that as shown in FIG. 4, the signal intensity of Mo and W as an internal standard tended to decrease as the introduction rate of the standard solution increased. The signal intensity of the internal standard corresponds to the sensitivity of the ICP-MS main body, and as long as the sensitivity of the ICP-MS main body does not change, the signal intensity is constant when Mo and W as an internal standard are introduced at a constant flow rate. However, as shown in FIG. 4, the signal intensity of Mo and W as an internal standard tends to decrease as the introduction rate of the standard solution increases, which shows that the sensitivity of the ICP-MS main body tends to decrease as the introduction rate of the standard solution increases. Thus, it was found that when a sample gas was analyzed by use of a laser ablation device or a gas exchange device, it was possible to maintain ICP-MS at a high sensitivity by performing control so that the introduction rate of the standard solution was as low as possible.

Figure 6:
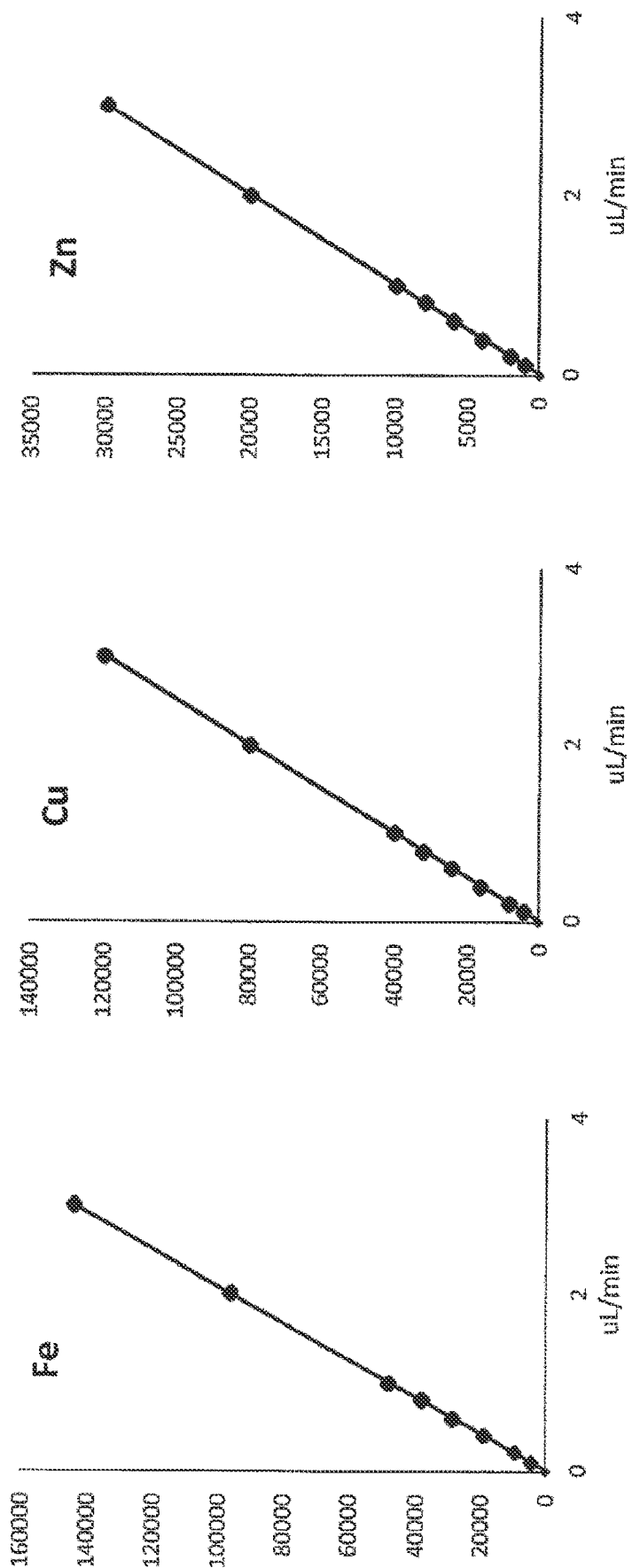
FIG. 6 is a graph showing a relationship between a standard solution introduction rate and a signal intensity of a specific element.

A standard solution containing a mixture of three metals of iron (Fe), copper (Cu) and zinc (Zn) was introduced into the standard solution nebulizer at an introduction rate of 3.0 µL/min or less, and the signal intensity at the introduction rate was examined. The results are shown in FIG. 6. FIG. 6 shows results for three metals in parallel, and in each graph, the ordinate represents a signal intensity (count), and the abscissa represents an introduction rate. It was found that for the three metals, the signal intensity increased in a linear manner when the flow rate was 3.0 µL/min or less. From this result, substantially 100% (total amount) of the standard solution directly supplied to the standard solution nebulizer was considered as having been introduced into the plasma when the standard solution was directly supplied to the standard solution nebulizer at a flow rate of 3 µL/min or less. When the flow rate was more than 3 µL/min, the signal intensity tended to decrease, and a phenomenon was observed in which the standard solution started to be trapped in the standard solution spray chamber.

<Verification 4> Standard solution sensitivities obtained via three nebulizers of the same type as standard solution nebulizers were compared. As the standard solution, a standard solution containing a mixture of three of vanadium (V), lead (Pb) and uranium (U) was used. As conditions, a standard solution of a mixture of the three metals with a concentration of 10 ng/mL was introduced from the standard solution nebulizer at a flow rate of 1 µL/min. The other conditions are the same as in the case of the standard solution in verification 3.

In addition, the signal intensity was examined with three metals of Cr, Mo and W used as internal standard metal elements. The three metals as an internal standard were derived from carbonyl compounds, and introduced by the method described in FIG. 5 for verification 3. Cr, Mo and W sublimated with the argon gas at a flow rate of 0.2 L/min were introduced into the torch section 104 through the metal standard gas introduction passage 303 while the standard solution was introduced. At this time, the argon gas flew out from the gas exchange device 301 (flow rate: 0.8 mL/min). The optimum total Ar gas flow for gas analysis becomes around 1.3 L/min that is higher than the analysis of normal aqueous analysis.

Table 1 shows the results of examination of the signal intensities of the metal elements when three nebulizers of the same type are used as standard solution nebulizers.

TABLE 1

In Table 1, the results for V, Pb and U in the standard solution show stability when three nebulizers of the same type are changed from one to another, and the results for Cr, Mo and W as an internal standard show stability of the ICP-MS main body.

| | Standard solution | | | Internal standard | | |
| --- | --- | --- | --- | --- | --- | --- |
| | V | Pb | U | Cr | Mo | W |
| Nebulizer-1 | 35,278 | 378,438 | 798,065 | 111,615 | 45,460 | 88,481 |
| Nebulizer-2 | 36,077 | 391,145 | 829,978 | 111,389 | 44,435 | 88,354 |
| Nebulizer-3 | 35,732 | 393,829 | 833,304 | 110,553 | 44,054 | 86,670 |
| SD | 401 | 8,221 | 19,456 | 559 | 727 | 1,011 |
| Average | 35,695 | 387,804 | 820,449 | 111,186 | 44,650 | 87,835 |
| RSD (%) | 1.12 | 2.12 | 2.37 | 0.50 | 1.63 | 1.15 |

For each of the relative standard deviations in the signal intensities of the elements shown in Table 1, subtraction of the relative standard deviation of the internal standard from the relative standard deviation of the standard solution in consideration of stability of the ICP-MS main body gave a relative standard deviation value of less than about 1%. The relative standard deviation of less than about 1% shows stability when three nebulizers of the same type are changed from one to another. In typical analysis with ICP-MS, the common introduction rate of a solution into a nebulizer is 200 µL/min, and at this level of solution introduction rate, changing of the nebulizer even to a nebulizer of the same type causes a significant change in signal intensity, so that the relative standard deviation is about 20%. However, introduction of the standard solution into the standard solution nebulizer at a flow rate of 1 µL/min was found to cause little change in signal intensity even when the nebulizer was changed to three nebulizers of the same type. Thus, substantially 100% (total amount) of the standard solution directly supplied to the standard solution nebulizer was considered as having been introduced into the plasma when the standard solution was directly supplied to the standard solution nebulizer at a flow rate of 1 µL/min or less.

From the results of the above four verifications, it was determined that when the standard solution is directly supplied to the standard solution nebulizer at a flow rate of 3 µL/min or less with 0.3 L/min of Ar nebulizer gas, substantially 100% (total amount) of the supplied standard solution can be introduced into a plasma.

A method for measuring the particle diameter of metal fine particles, and a method for measuring the number of metal fine particle and the concentration of metal fine particles in a sample solution will now be described. As shown in verification 1, when a standard solution containing Au in an amount of 10 ppb is used, a signal intensity detected when a standard solution is directly suctioned into the standard solution nebulizer at a flow rate of 1 µL/min shows that a standard solution sensitive value that is a specific element weight per standard solution signal intensity count is 167,000/29,159=5.72 ag/counts.

Next, a sample solution containing Au metal fine particles having an unknown particle diameter was put in the sample storage section, the sample solution was suctioned into the sample solution nebulizer at a flow rate of 60 µL/min (1 µl/sec) for 1 minute, and a signal intensity detected was examined. In analysis of the sample solution, pure water was supplied to the standard solution nebulizer at a flow rate of 1 µL/min in the standard solution introduction apparatus. In addition, argon gas (Ar) was supplied to the standard solution nebulizer and the sample solution nebulizer.

The detection result obtained with the sample solution showed that the signal intensity per Au metal fine particle in the sample solution was 381 counts. In this case, the total weight of one Au metal fine particle detected is 5.72×381=2,183.9 ag. From the total weight and the density of Au (19.32 g/cm$^3$), a volume was calculated, and from the volume, a particle diameter was calculated. The result showed that the metal fine particle had a particle diameter of 60 nm (the volume was calculated as 2,183.9/19.32=1.13E−16 cm$^3$, and the particle diameter was calculated from the equation: sphere volume=$4\pi r^3/3$. The physical amount of a specific element in the present invention includes the atomic weight of the specific element and the density of the specific element.

In the detector, when one Au metal fine particle is detected, a signal intensity corresponding to an ion of a metal element forming the metal fine particle appears as a peak, and therefore the number of the peaks is measured as the number of the Au metal fine particles reaching the detector. The number of Au metal fine particles reaching the detector per minute was 1300. In addition, the average signal intensity of the peaks was 30 counts.

Measurement of transmission efficiency of the sample solution spray chamber will now be described. A sample standard solution containing Au in an amount of 1 ppb was provided as a sample solution, the sample standard solution was suctioned into the sample solution nebulizer at a flow rate of 60 µL/min, and a signal intensity detected was examined. In analysis of the standard solution, pure water was supplied to the standard solution nebulizer at a flow rate of 1 µL/min on the ICP-MS main body side. In addition, argon gas (Ar) was supplied to the standard solution nebulizer and the sample solution nebulizer. The flow rate of the sample standard solution is measured by feeding an air bubble into the solution from an air injection valve, sensing the air bubble with two optical sensors, and calculating a movement speed between two points.

A signal intensity of 20,000 counts was detected per second with the sample standard solution. The introduction rate into the sample solution nebulizer is 1 pg/sec=1,000 fg/sec=1,000,000 ag/sec.

The sample introduction section sensitivity value that is a specific element weight per sample standard solution signal intensity count is 50 ag/count. As shown in verification 1, the standard solution sensitivity value is divided by the sample introduction section sensitivity value (5.72/50=0.114) to obtain transmission efficiency of the sample solution spray chamber (11.4%).

The number of Au metal fine particles in the sample solution can be calculated with the transmission efficiency of the sample solution spray chamber into consideration. As described above, it is shown that 60 µL of the sample solution contained 11,403 (1,300/0.114) Au metal fine particles because 1300 Au metal fine particles were detected per minute in analysis of the sample solution containing Au metal fine particles.

The average signal intensity of 1,300 particles, which is obtained with the sample solution, is 30 counts, the total integrated value of Au metal fine particle signal intensities per minute is 1,300×30=39,000 counts, and the total weight of Au is 5.72×39,000=223,080 ag. When the transmission efficiency of the spray chamber is taken into consideration, the total weight of Au in the sample solution is 223,080/0.114=1,956,842 ag. Since the volume of 60 µL includes the total weight of Au, the Au metal fine particle concentration of the sample solution is 1,956,842/60=32,614 ag/µL=32.6 fg/µL=0.032 pg/µL (ppb).

Analysis of a solution-based sample has been described above. When metal fine particles contained in gas are analyzed, a laser ablation device for irradiating a solid sample to be measured with laser light to evaporate and atomize the sample, or a gas exchange device for replacing by argon gas a gas component of a sample gas containing an object to be measured is used. In analysis of metal fine particles contained in gas as described above, a sample gas generated by the laser ablation device or the gas exchange device is directly introduced into the torch section. In analysis of such a sample gas, a nebulizer or a spray chamber as used for the solution-based sample is not used, substantially 100% (total amount) of the sample gas supplied to the torch section is introduced into a plasma. Analysis of the sample gas corresponds to the apparatus schematic diagram shown in FIG. 5. In FIG. 5, a gas exchange device is provided, and by providing a laser ablation device at the place of the gas exchange device, a fixed sample can be analyzed. The particle diameter of metal fine particles contained in the sample gas can be calculated only by analyzing the standard solution with the apparatus shown in FIG. 5.

The number of metal fine particles of the specific element in the sample gas is accumulated through measuring the number of peaks of the particles from the detection result with the sample gas. The concentration of metal fine particles of the specific element in the sample gas can be calculated from the total integrated value of specific element metal fine particle signal intensities obtained from the detector by introduction of the sample gas, and the introduction rate of the sample gas.

INDUSTRIAL APPLICABILITY

In the present invention, the particle diameter of metal fine particles contained in a sample can be measured and the number of metal fine particles and the concentration of metal fine particles contained in the sample can be analyzed without the need of standard metal fine particles. Thus, various analyses such as continuous real-time monitoring of metal fine particles in the air, analysis of mercury (Hg) in the air and exhaust gas, analysis of metal components in cigarette smoke, and analysis of a very small amount of metal impurities in various kinds of gases that are used in production of semiconductors can be quickly and efficiently performed with ICP-MS.

REFERENCE SIGNS LIST

1 ICP-MS (main body)
101 Sample storage section
102 Sample solution nebulizer
103 Sample solution spray chamber
104 Torch section
105 Interface section
106 Mass analysis section
107 Detector
108 Optical sensor
109 Inflation valve
110 Flow passage
2 Standard solution introduction apparatus
201 Standard solution storage container
202 Syringe pump
203 Standard solution nebulizer
204 Standard solution spray chamber
205 Waste container
206 Standard solution introduction passage
301 Gas exchange device
302 Metal standard gas generator
303 Metal standard gas introduction passage

The invention claimed is:

1. A method for analyzing metal fine particles in gas comprising use of an inductively coupled plasma mass spectrometer, the spectrometer comprising:
a gasified sample introduction section including a sample nebulizer and a sample spray container which introduces a sample gas generated by a laser ablation device comprising a laser which evaporates and atomizes a sample by irradiating a solid sample to be measured with laser light, or a gas exchange device which replaces by argon gas with a gas component of the sample gas containing an object to be measured; and
a torch section which ionizes the sample and forms a plasma; an interface section which takes ions from the plasma; a mass analyzer which separates ions; and a detector which detects the separated ions, wherein the method comprises:
providing the inductively coupled plasma mass spectrometer with a standard solution introduction apparatus comprising a storage unit which stores a standard solution containing a specific element in a known concentration, a syringe pump which stores and discharges the standard solution, and a standard solution introduction unit having a standard solution nebulizer that is supplied with the standard solution, and a standard solution spray chamber combined with the standard solution nebulizer,
connecting a standard solution introduction passage which introduces the standard solution flowing out from the standard solution spray chamber to a flow passage connecting the gasified sample introduction section to the torch section,
supplying the standard solution directly to the standard solution nebulizer at a flow rate of 3 μL/min or less thereby introducing the standard solution into the torch section from the standard solution introduction unit, and determining a standard solution sensitivity value that is a specific element weight per standard solution signal intensity count based on a standard solution signal intensity obtained from a detector and a physical amount of the introduced specific element, and
calculating a particle diameter value of metal fine particles of the specific element from a signal intensity count number of one metal fine particle of the specific element, which is obtained from the detector by introducing the sample gas, and the standard solution sensitivity value.

2. An inductively coupled plasma mass spectrometry method which analyzes a metal fine particle number and a metal fine particle concentration defined in claim 1 by using the standard solution sensitivity value in the method which analyzes metal fine particles in gas, wherein the method comprises:
introducing the sample gas to be measured into the torch section from the sample introduction section thus measuring the number of specific element metal fine particles obtained from the detector, and
calculating a metal fine particle concentration of the sample gas from a total integrated value of specific element metal fine particle signal intensities obtained from the detector by introduction of the sample gas, the standard solution sensitivity value and the introduction rate of the sample gas.

* * * * *